United States Patent
Chiu et al.

(10) Patent No.: US 6,790,388 B2
(45) Date of Patent: Sep. 14, 2004

(54) METHOD OF INJECTION MOLDING AN OPTICAL ARTICLE OUT OF THERMOPLASTIC SYNTHETIC MATERIAL

(75) Inventors: Hao-Wen Chiu, Clearwater, FL (US); Hsinjin Yang, Palm Harbor, FL (US)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 369 days.

(21) Appl. No.: 10/015,663

(22) Filed: Dec. 17, 2001

(65) Prior Publication Data

US 2003/0111749 A1 Jun. 19, 2003

(51) Int. Cl.[7] .............................................. B29D 11/00
(52) U.S. Cl. ........................................ 264/2.2; 425/808
(58) Field of Search ........................... 264/1.1, 2.2, 2.5, 264/328.7; 425/808

(56) References Cited

U.S. PATENT DOCUMENTS

| | | | |
|---|---|---|---|
| 2,473,588 A | | 6/1949 | Johnson |
| 4,364,878 A | * | 12/1982 | Laliberte et al. .............. 264/2.2 |
| 4,836,960 A | * | 6/1989 | Spector et al. ................ 264/2.2 |
| 5,376,317 A | * | 12/1994 | Maus et al. ................. 264/40.6 |
| 5,415,817 A | * | 5/1995 | Shiao et al. .................. 264/2.2 |
| 5,458,820 A | | 10/1995 | Lefebve |
| 5,620,635 A | | 4/1997 | DeRozier et al. |
| 6,099,765 A | | 8/2000 | Yamanaka et al. |
| 6,440,335 B1 | * | 8/2002 | Kingsbury et al. .......... 264/2.2 |

FOREIGN PATENT DOCUMENTS

| | | |
|---|---|---|
| FR | 2 525 525 | 10/1983 |
| WO | 99/24243 | 5/1999 |

* cited by examiner

Primary Examiner—Mathieu D. Vargot
(74) Attorney, Agent, or Firm—Young & Thompson

(57) ABSTRACT

For each lens molding cycle, the method comprises the following steps:
- raising the wall of the mold cavity to a heating temperature higher than or equal to the molding temperature of said material;
- filling the molding cavity with said material;
- at the end of filling, increasing the pressure of said material introduced in this way into the molding cavity up to a compacting pressure; and
- bringing the wall of the molding cavity to a cooling temperature to cool said molded material down to an unmolding temperature below its molding temperature, said cooling temperature being lower than said unmolding temperature.

The molding cavity begins to be filled with said material before the heating temperature has been reached. Once both the compacting pressure of said material and the heating temperature of the molding cavity wall have been reached, they are both maintained for a given length of time.

12 Claims, 3 Drawing Sheets

METHOD OF INJECTION MOLDING AN OPTICAL ARTICLE OUT OF THERMOPLASTIC SYNTHETIC MATERIAL

The present invention relates to manufacturing optical articles out of thermoplastic synthetic material, such as ophthalmic lenses, instrument lenses or precision optics, as obtained by injection molding.

BACKGROUND OF THE INVENTION

The molding of ophthalmic lenses out of thermoplastic synthetic material is usually performed by injection molding, with this method enabling raw plastics material to be transformed directly into finished lenses. In the manufacture of lenses by a method of this kind, it is conventional for the thermoplastic material to be initially heated so as to be molten at a temperature above the vitreous transition point. While in this form, the material is introduced under high pressure into a mold cavity of appropriate dimensions and shape that is formed in a mold. The material is then allowed to cool down so as to solidify, after which the resulting lens is extracted from the mold. Usually, the material used is a thermoplastic resin such as polymethyl methacrylate, polycarbonate, or a copolymer of polycarbonate, polynorbornene, polystyrene, cyclic polyolefins and their copolymers, etc.

To obtain ophthalmic lenses possessing optical qualities suitable for their purpose, certain precautions need to be taken during manufacture, in particular to avoid irregular deformations or the presence of residual internal tensions. Such deformations or tensions give rise to anisotropy or to other undesirable optical aberrations such as double refraction.

In this respect, particular care is taken in making the wall of the mold cavity in the mold. Usually, the mold cavity is made up of two shells each having a mold face of appropriate curvature corresponding to the curvatures that are to be given to a finished lens. The shells are generally made of stainless steel, and they present optical polish, i.e. analogous to that of a mirror.

It is often recommended to perform injection of the material into the mold cavity in two successive stages: a first stage of filling proper during which the mold cavity is filled progressively; and a second stage of overpacking or compression that occurs after the mold cavity has been filled completely. This second stage of overpacking or compression consists in subjecting the material that has been introduced into the mold cavity to high pressure for a given length of time and it is intended to eliminate shrink marks, to ensure that the material has the proper density, and to reduce any harmful internal tensions, at least to some extent. When this holding pressure is generated by the injection machine itself, the process is referred to as overpacking. When it is the result of the mold shells being moved towards each other, it is said to be compression.

These precautions relating to the tooling and the mode of operation need to be associated with precautions relating to heating of the plastics material and of the mold during molding. Usually, the mold is provided with channels for circulating a heat-conveying fluid to regulate the temperature of the wall of the mold cavity from one cycle to the next, and to accelerate the removal of heat from the molded lens.

In order to avoid surface cooling taking place before the end of injection, with a cold "skin" forming on the synthetic material that is injected into the mold cavity, proposals have been made in patent U.S. Pat. No. 5,376,317 (published Dec. 27, 1994) to proceed, prior to introducing material into the mold cavity, with heating of the wall of the mold cavity so as to bring it to a molding temperature which is higher than the vitreous transition temperature of said synthetic material. In particular, when the material is polycarbonate, which has a vitreous transition temperature of about 160° C., the wall of the mold cavity is heated to a temperature of about 260° C.

However, according to the teaching of that document, the heating of the mold cavity wall must be fully accomplished before any material begins to be injected into the mold cavity. The reason is that the fundamental purpose of the technique described in that document is to prevent the surface of the molten material solidifying while it is being injected, and in this way to prevent as much as possible any tension appearing during filling. According to that teaching, it is out of the question to attempt to relax such stresses, and on the contrary it is necessary to act upstream in order to prevent such stresses from appearing.

That technique gives rise to a major drawback: cycle time is considerably lengthened by running the heating and injection stages sequentially, given that their respective durations can be compressed very little. Furthermore, during filling and in spite of the wall of the mold cavity being heated, internal tensions are inevitably induced in the material by the high pressure and by the flow to which it is subjected. These tensions then become frozen in and sustained by the rapid cooling of the material which begins immediately after injection (i.e. without any pause after the overpacking or compacting stage).

OBJECTS AND SUMMARY OF THE INVENTION

An object of the invention is to further reduce the residual tensions within a lens molded in this way so as to improve its optical quality, but without lengthening cycle time, and possibly even reducing it.

To achieve this object in particular, the invention provides a method of injection molding an optical article such as an ophthalmic lens out of thermoplastic synthetic material by means of a mold containing a mold recess, said material being previously melted to a molding temperature higher than or equal to its vitreous transition temperature, the method comprising, for each lens molding cycle, the following steps:

raising the wall of the mold cavity to a heating temperature higher than or equal to the molding temperature of said material;

filling the molding cavity with said material;

at the end of filling, increasing the pressure of said material introduced in this way into the molding cavity up to a compacting pressure; and bringing the wall of the molding cavity back to a cooling temperature to cool said molded material down to an unmolding temperature below its molding temperature, said cooling temperature being lower than said unmolding temperature;

in which method the filling of the molding cavity with said material begins before the heating temperature has been reached, and once both the compacting pressure of said material and the heating temperature of said molding cavity have been reached, they are both maintained for a given length of time.

The cycle time is thus reduced since the wall of the mold cavity continues to be heated in parallel with material being injected. Injection is then followed by a stage of maintaining the temperature during which the internal tensions that can arise during injection are relaxed. According to the invention, the essential point is for the molded synthetic material, and in particular its surface, to be maintained at a temperature higher than its vitreous transition temperature after injection has been performed, so as to allow the internal tensions in the material that result from it being injected to relax and so as to allow the material to be shaped under pressure inside the mold cavity. It is of little importance that the mold has still not reached its molding temperature before beginning to inject. Internal stresses will be relaxed in any event after injection has been completed. All of the physical and chemical properties of the synthetic material are thus conserved, or more precisely restored, without disturbance.

Filling can begin at the same time as the temperature of the mold wall cavity begins to be raised, or while it is being raised. Thus:

either the filling of the mold cavity with said material and the raising the temperature of the mold cavity wall both begin simultaneously; or else the filling of the mold cavity with said material begins while the temperature of the mold wall cavity is already being raised; in which case, more precisely, filling is started less than 30 seconds (s) and/or more than 5 seconds after starting to raise the temperature of the mold wall cavity.

It can also be advantageous for the filling of the mold cavity with said material to terminate and for the pressure of said material to begin to be raised before the heating temperature has been reached. It is even possible to provide for the pressure at which said temperature is compacted to be reached before the wall of the mold cavity reaches the heating temperature.

Concerning the heating and cooling temperatures and the times at which they need to be acquired, experiments have shown that the following values when taken individually or in combination are advantageous, in particular when said material is polycarbonate:

the heating temperature lies in the range 30° F. to 120° F. above the vitreous transition temperature of the thermoplastic material used; for polycarbonate whose vitreous transition temperature is 300° F., this corresponds to a heating temperature lying in the range 330° F. and 420° F.;

the cooling temperature lies in the range 20° F. and 100° F. below the molding temperature of said material; for polycarbonate whose vitreous transition temperature is 300° F., this corresponds to a cooling temperature lying in the range 280° F. and 200° F.;

the time required to raise the temperature of the mold cavity wall from its cooling temperature to its heating temperature lies in the range 30 s and 150 s and is preferably about 60 s;

the time required to lower the temperature of the mold wall cavity from its heating temperature to its cooling temperature lies in the range 30 s and 150 s and is preferably about 60 s; and the time during which the compacting pressure of said material and the heating temperature of the mold wall cavity is maintained after being reached is greater than 5 s and preferably lies in the range 10 s to 30 s.

BRIEF DESCRIPTION OF THE DRAWINGS

Other characteristics and advantages of the invention will appear on reading the following description of a particular implementation given by way of non-limiting example.

Reference is made to the accompanying drawings, in which.

MORE DETAILED DESCRIPTION

To implement the injection molding method of the invention, a mold is used that possesses means for controlling its temperature precisely, for example a mold as described below with reference to FIGS. 1 and 2. Nevertheless, the method of the invention can also be implemented using other molds that include heating and cooling means, such as the molds described in detail in documents FR-2 525 525 and U.S. Pat. No. 5,376,317, and the teaching thereof in this respect is expressly incorporated in the present application by reference.

Figure 1:
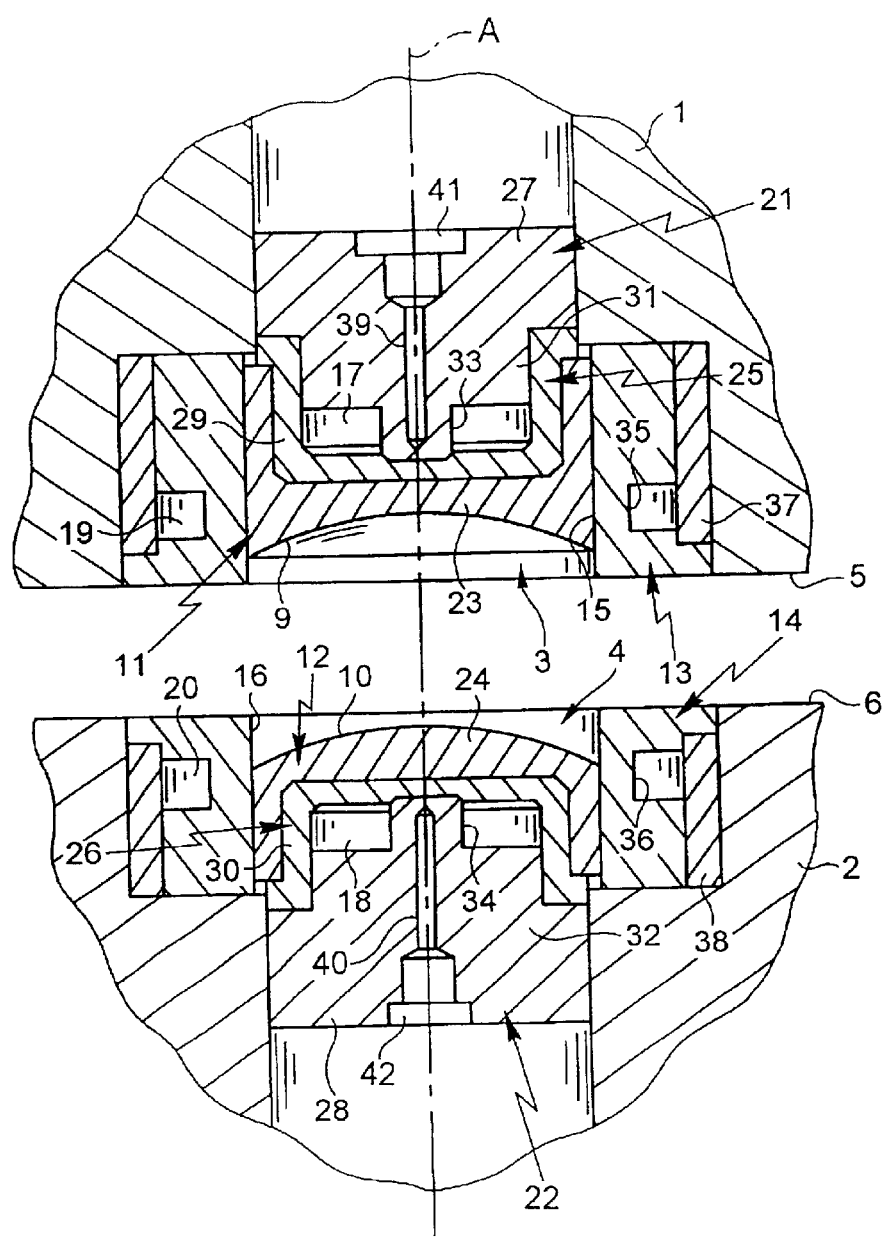
FIGS. 1 and 2 are fragmentary views of the zone containing the mold cavity of a mold for implementing the method of the invention, this zone being shown in section on a plane containing the axis of the mold cavity, and being shown respectively in an open configuration and in a closed configuration.
Figure 2:
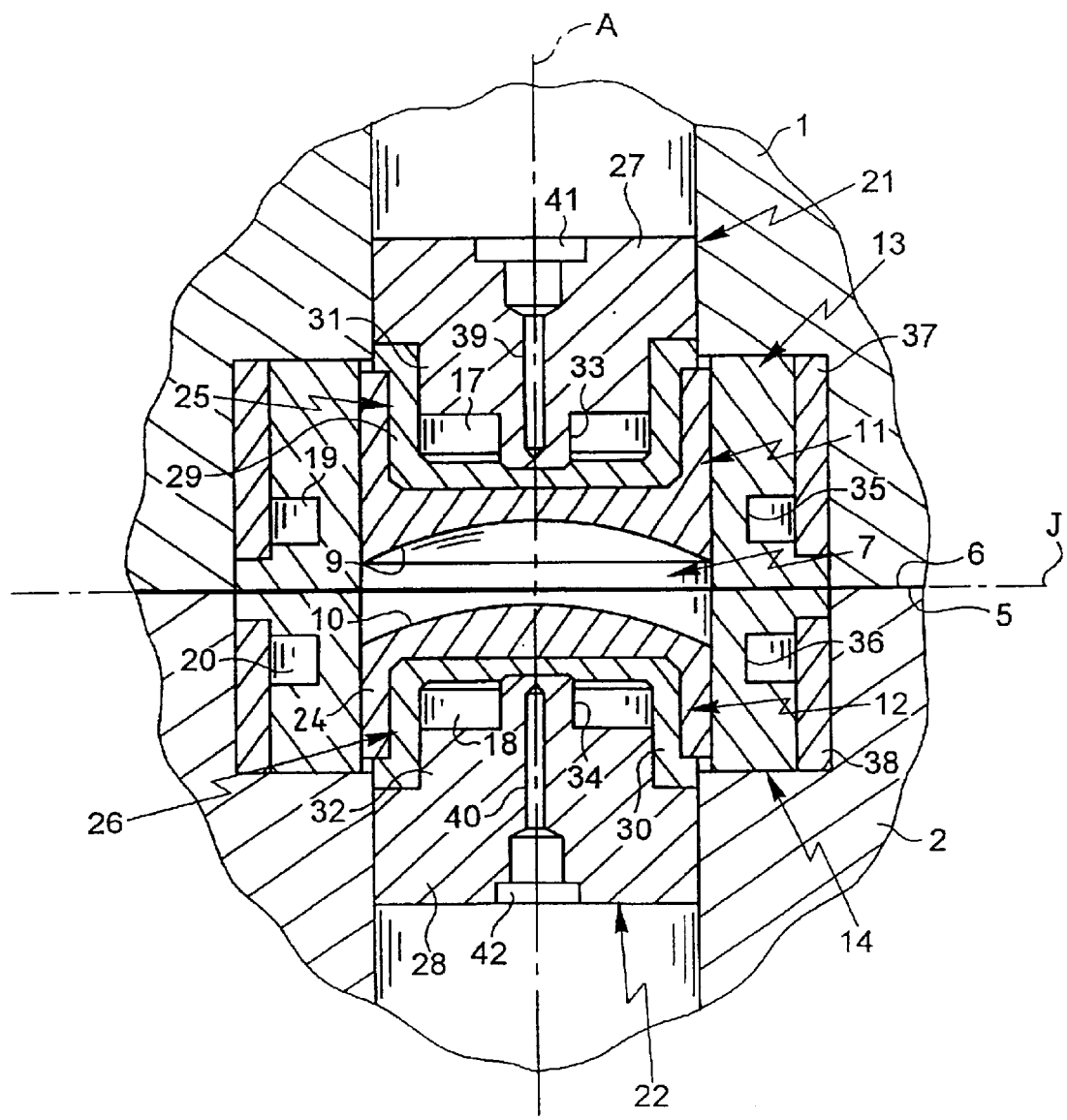

The mold shown in FIGS. 1 and 2 comprises two half-blocks 1, 2 each possessing at least one respective mold recess 3, 4 of outline that is cylindrical about the axis A.

The two half-blocks 1, 2 can move relative to each other, for example in translation along the axis A, between an open configuration giving direct access to the recesses 3, 4 and a closed configuration in which the two half-blocks 1, 2 make contact via junction faces 5, 6 in a transversal join plane referenced J in FIG. 2 and in which the recesses 3, 4 co-operate in order to form the desired mold cavity 7.

In practice, each half-block 1, 2 preferably has a plurality of mold recesses such as 3, 4 and, in the closed configuration, these recesses co-operate in pairs to form a plurality of mold cavities such as 7, thus making it possible for a single mold to make a plurality of lenses simultaneously.

Each recess 3, 4 is defined transversely by the working face 9, 10 of a shell 11, 12. In the example shown in the figures, the working face 9 of the upper shell 11 is concave while the working face 10 of the lower shell 12 is convex.

Each shell 11, 12 is received in a tubular jacket 13, 14 on the axis A and presents a cylindrical inside face 15, 16 about the axis A serving to define the sides of the recess 3, 4, in addition to the working faces 9, 10 of the shells 11, 12. The faces 9, 10, 15, and 16 thus form the wall of the recesses 3, 4 and thus of the mold cavity 7.

Each shell 11, 12 and the associated jacket 13, 14 is provided with its own heat-transfer means that are intrinsic and both-way. The term "both-way" is used to mean suitable both for heating and for cooling the shell 11, 12 and its jacket 13, 14. The term "intrinsic" is used to indicate that the means are not of external origin but act directly, by construction, on each shell 11, 12 and each jacket 13, 14.

More precisely, in this case, the intrinsic and both-way heat-transfer means of a shell 11, 12 or of a jacket 13, 14 is implemented in the form of an internal circuit for circulating a heat-conveying fluid. Thus, each shell 11, 12 has a respective circuit 17, 18 and each jacket 13, 14 has a respective circuit 19, 20. Naturally, this form of implementation is not exclusive; for example it is possible to provide resistance elements, internal circuits for circulating a gas, convection means, etc.

In addition, whatever the way in which they are implemented, the intrinsic and both-way heat-transfer means of the jackets 13 and 14, i.e. specifically the circuits 19 and 20, are advantageously independent of the means 17, 18 belonging to the shells 11, 12. This independence makes it possible to achieve finer regulation of temperature gradient, not only in time but also in space around the mold cavity 7, and also finer regulation of the temperature of the mold cavity wall constituted by the working faces 9, 10 of the shells 11, 12 and the inside faces 15, 16 of the jackets 13, 14 when the mold is in the closed configuration.

Each shell 11, 12 comprises two portions:

a base 21, 22; and a removable insert 23, 24 fitted on the base 21, 22 and carrying the working face 9, 10.

The base 21, 22 receives the heat-transfer means of the corresponding shell 11, 12 in full, i.e. it receives the entire circuit 17, 18. The insert 23, 24 therefore has no intrinsic heat-transfer means and is temperature-regulated solely by heat transfer with the base 21, 22.

Each insert 23, 24 is in the form of a cap, and because of its shape it covers a head portion 25, 26 of the base 21, 22, with the exception of the foot portion of said base.

The heat-transfer means of the base constituted by the circuit 17, 18 is allocated to the head portion 25, 26 of the base that is covered by the cap-shaped insert 23, 24.

In the example shown, the base 21, 22 has two portions: a plinth 27, 28 and a lid or tip 29, 30 covering a smaller-diameter head portion 31, 32 of the plinth 27, 28. This head portion 31, 32 presents a step 33, 34 at its end which co-operates with the lid 29, 30 to define the circuit 17, 18 for circulating the heat-conveying fluid, which is in the form of an annulus around the axis A.

A feed channel 39, 40 is formed in the plinth 27, 28 on the axis A. This channel opens out into the annular circuit 17, 18 and possesses an inlet 41, 42 suitable for receiving a coupling (not shown) fitted to the end of a feed duct (not shown) for delivering hot or cold fluid. Similarly, a return channel (not shown) is provided in the plinth 27, 28 to enable fluid to be removed after heat exchange.

The jacket 13, 14 possesses an annular groove 35, 36 formed in a setback of a cylindrical outside face about the axis A of the jacket 13, 14. This groove is closed by a tubular web 37, 38 fitted onto the outside face of the jacket 13, 14 to form the circuit 19, 20 for circulating the heat-conveying fluid, which circuit is annular in shape about the axis A.

A lens of thermoplastic synthetic material is injection molded using the above-described mold in the following manner.

The material, which in this case is polycarbonate, is previously melted to a molding temperature which is higher than or equal to its vitreous transition temperature. Lenses are then molded in series, in a succession of molding cycles that are repeated identically.

Figure 3:
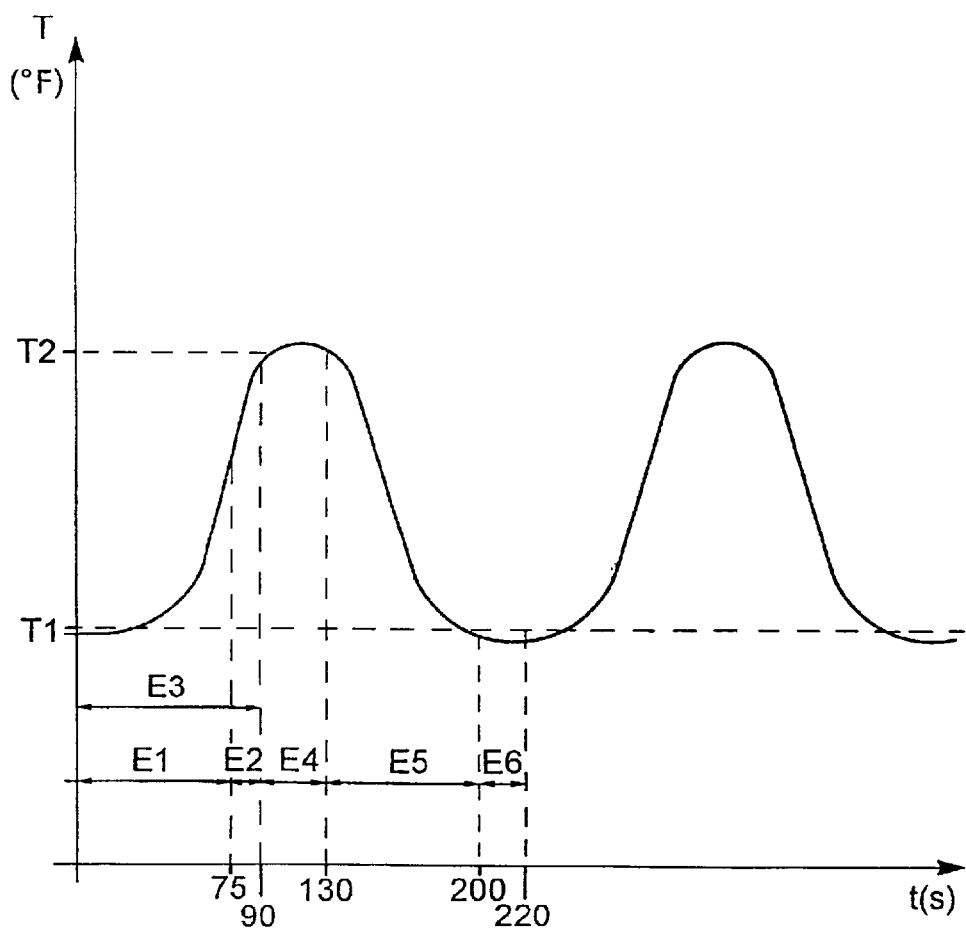
FIG. 3 is a graph showing how the temperature of the mold wall cavity varies as a function of time during successive steps of the molding method of the invention.

Each molding cycle comprises six main steps, referenced E1 to E6 in FIG. 3. Steps E1, E2, E4, E5, and E6 follow in succession, whereas in accordance with the invention, step E3 takes place in parallel with steps E1 and E2.

The first step E1 consists in filling the mold cavity 7 with the thermoplastic material.

The second step E2 takes place at the end of filling and consists in increasing the pressure of said material as introduced into the mold cavity until a compacting pressure is reached.

The third step E3 which takes place in parallel with the steps E1 and E2 consists in heating the wall of the mold cavity 7 as constituted by the faces 9, 10, 15, and 16. At the end of the cycle (see below) this wall is at a "cooling" temperature which is lower than the molding temperature for the material. In order to avoid skin effects and in order to enable internal tensions to be relaxed, the wall of the molding cavity 7 is raised to a heating temperature which is higher than or equal to the molding temperature of the thermoplastic material.

The choice of heating temperature is a question of compromise: the higher the temperature, the better the relaxing of internal tension, but the longer the duration of the cycle. In testing, satisfactory results have been obtained with a heating temperature lying in the range 30° F. to 120° F. above the vitreous transition temperature of the material used. For polycarbonate whose vitreous transition temperature is 300° F., this corresponds to a heating temperature lying in the range 330° F. to 420° F., with a heating temperature that is preferably about 380° F. The term "about" means within 10%.

The time taken to raise the temperature of the mold cavity wall from its cooling temperature to its heating temperature lies in the range 30 s and 150 s and is preferably about 60 s.

It will be understood that since step E3 takes place simultaneously with steps E1 and E2, filling begins before the wall of the mold cavity 7 has reached its heating temperature. This method of performing heating "in parallel" with injection (filling and compacting) makes it possible to reduce cycle time significantly.

In the example shown, the filling of the mold cavity with said material and the raising of the temperature of the mold cavity wall both begin simultaneously.

Nevertheless, it would be possible, on the contrary, for the filling of the mold cavity with said material to begin while the temperature of the mold cavity wall is already being raised. For example, the mold cavity can start to be filled with said material more than 60 s after beginning to raise the temperature of the mold cavity wall. Under such circumstances, in order to avoid increasing cycle time, it is preferable for the mold cavity to start being filled with said material less than 30 s after the beginning to raise the temperature of the mold cavity wall.

Still for the purpose of reducing cycle times, step E1 of filling the mold cavity with said material terminates, and step E2 of raising the pressure of said material begins, before the end of step E3, i.e. before the heating temperature T2 has been reached. Although not applicable to the example shown in FIG. 3, it is even possible to provide for step E2 to terminate, i.e. for the compacting pressure of said material to be reached, before the heating temperature has been reached.

The fourth step E4 consists in maintaining, for a given length of time, the compacting pressure for said material and the heating temperature of the mold cavity wall, once they have both been reached.

The time during which the compacting pressure of said material and the heating temperature of the mold wall cavity are maintained, once they have been reached, is greater than 5 s and preferably lies in the range 10 s to 30 s.

The fifth step E5 consists in bringing the mold cavity wall back to a cooling temperature so as to cool said molded material down to an unmolding temperature which is below its molding temperature, said cooling temperature being below said unmolding temperature. The cooling temperature lies in the range 20° F. and 100° F. below the molding temperature of said material. For polycarbonate whose vitreous transition temperature is 300° F., this corresponds to a cooling temperature lying in the range 280° F. and 200° F., with the cooling temperature preferably being about 250° F.

The time required to lower the temperature of the molding cavity wall from its heating temperature down to its cooling temperature lies in the range 30 s and 150 s, and is preferably about 60 s.

The sixth step E6 consists in ejecting the solidified lens. For this purpose, the mold is naturally opened prior to injection and is then reclosed.

What is claimed is:

1. A method of injection molding a lens out of thermoplastic synthetic material by means of a mold containing a mold recess, said material being previously melted to a molding temperature higher than or equal to its vitreous transition temperature, the method comprising, for each lens molding cycle, the following steps:

raising the wall of the mold cavity to a heating temperature higher than or equal to the molding temperature of said material;

filling the molding cavity with said material;

at the end of filling, increasing the pressure of said material introduced in this way into the molding cavity up to a compacting pressure; and bringing the wall of the molding cavity to a cooling temperature to cool said molded material down to an unmolding temperature below its molding temperature, said cooling temperature being lower than said unmolding temperature;

wherein the filling of the molding cavity with said material begins before the heating temperature has been reached, and wherein, once both the compacting pressure of said material and the heating temperature of said molding cavity have been reached, they are both maintained for a given length of time.

2. A method according to claim 1, in which the filling of the molding cavity with said material and the raising of the temperature of the molding cavity wall both begin simultaneously.

3. A method according to claim 1, in which the filling of the molding cavity with said material begins while the temperature of the molding cavity wall is being raised.

4. A method according to claim 3, in which the filling of the molding cavity with said material is started less than 30 s after beginning to raise the temperature of the molding cavity wall.

5. A method according to claim 3, in which the filling of the molding cavity with said material is started more than 5 s after beginning to raise the temperature of the molding cavity wall.

6. A method according to claim 1, in which the filling of the molding cavity with said material terminates and the rise in the pressure of said material begins before the heating temperature has been reached.

7. A method according to claim 6, in which the compacting pressure of said material is reached before the heating temperature has been reached.

8. A method according to claim 1, in which the heating temperature lies in the range 30° F. to 120° F. above the vitreous transition temperature of said material.

9. A method according to claim 1, in which the cooling temperature lies in the range 20° F. to 100° F. below the molding temperature of said material.

10. A method according to claim 1, in which the time required to raise the temperature of the molding cavity wall from its cooling temperature to its heating temperature lies in the range 30 s to 150 s, and is preferably about 60 s.

11. A method according to claim 1, in which the time required to lower the temperature of the molding cavity wall from its heating temperature to its cooling temperature lies in the range 30 s to 150 s, and is preferably about 60 s.

12. A method according to claim 1, in which the time during which the compacting pressure of said material and the heating temperature of the mold cavity wall are maintained after they have been reached is greater than 5 s and preferably lies in the range 10 s to 30 s.

* * * * *